Jan. 24, 1956   J. B. FLEMING   2,732,017
FIRE EXTINGUISHER FOR AUTO TIRES
Filed Dec. 7, 1954
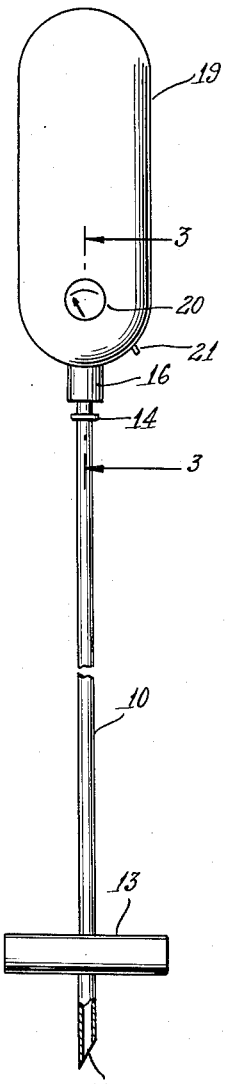
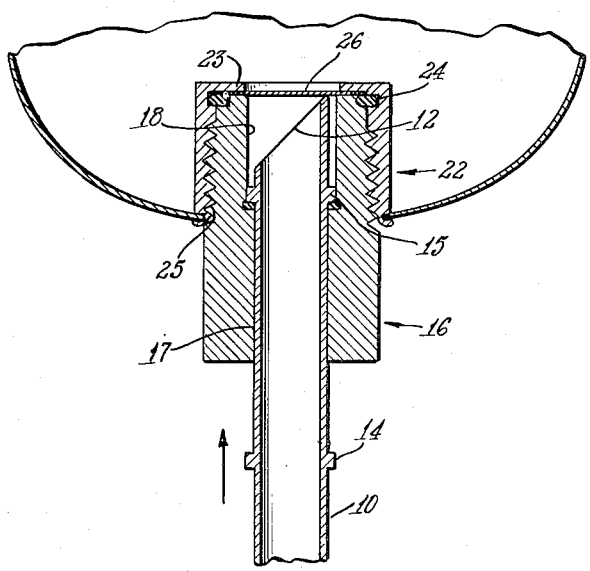
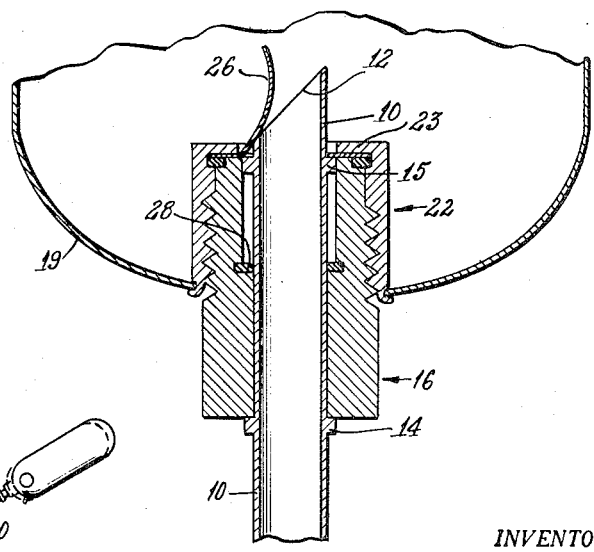
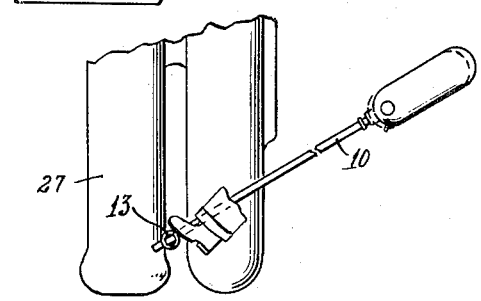
INVENTOR.
Jere B. Fleming
BY
Frank M. akara
ATTORNEY

United States Patent Office 2,732,017
Patented Jan. 24, 1956

2,732,017
FIRE EXTINGUISHER FOR AUTO TIRES
Jere B. Fleming, New York, N. Y.

Application December 7, 1954, Serial No. 473,631

3 Claims. (Cl. 169—31)

This invention relates to a fire extinguisher for automobile tires.

In trailer-trucks and other vehicles particularly those using double wheels adjacently disposed on axle, it is quite common for the inner tire to be spontaneously ignited. This ignition is due to the heat generated between the tire and the road. It is particularly frequent where trucks carrying heavy loads for long periods of time on hot roads have insufficient or low pressure in the inner tire of a dual wheeled assembly.

It is an object of this invention to provide a fire extinguisher adapted for dispersing fire extinguishing material inside a tire burning interiorly to extinguish the enclosed fire.

It is another object of this invention to provide an inexpensive, readily portable and efficient fire extinguisher for putting out tire fires burning inside an inflated tire.

These and other objects of this invention will become apparent upon reading the following descriptive disclosure taken in conjunction with the accompanying drawing of an illustrative embodiment of this invention and in which:

Fig. 1 is a front view of the fire extinguisher broken away in part to show the hollow elongated tube, Fig. 2 is a schematic view showing the manner of inserting the tube by means of foot pressure into a tire wall and further showing the initial and subsequent position of the container bomb as actuated by hand pressure after the insertable tube has been inserted into the tire wall, Fig. 3 is a partial section view taken at the juncture of the insertion tube and the container bomb, taken on line 3—3 of Fig. 1, and showing the bomb in sealed relationship to the tube and Fig. 4 is a view similar to that of Fig. 3 but showing sealing diaphragm punctured by the insertion tube.

Referring now to Figs. 1 and 2, a relatively long insertion tube 10 having a first obliquely cut point 11 at its bottom and a second oblique cut point 12 at its top is provided with a pedal shoulder 13 fixedly united to the tube 10 in suitable spaced relationship to point 11.

The points 11 and 12 are sharp hypodermic-like piercing points, the point 11 being inserted by foot pressure applied to shoulder 13 into and through a tire carcass and tube while the point 12 is pierced through a sealing diaphragm normally sealing off the high pressure gas and fire extinguishing contents therein of a gas bomb from said tube 10.

The pedal shoulder 13 may be an apertured tube with the tube 10 passing through the aperture, and thereafter the shoulder 13 and tube 10 are welded together. Other conventional pedal shoulders fixed by conventional means to the tube 10 are operable.

The top of tube 10 is provided with a pair of fixed rings 14 and 15 disposed in appropriate spaced apart relationship (Figs. 3 and 4).

A moveable tubular collar 16 is provided with a top diameter borehole 17 adapted to receive tube 10 which borehole 17 merges with a borehole 18 of larger diameter and adapted to receive ring 15. The length of bore hole 18 is such as to completely receive the point 12 (Fig. 3).

An ovaloid high pressure resistant gas bomb 19 is provided with a high pressure gauge 20 and a gas filling valve 21 of conventional make. The bomb 19 is also provided with a threaded tubular well piece 22 fixedly secured as by welding in the bomb mouth. The threaded well piece 22 is provided with an inner circular shoulder 23 adapted to receive a compressible sealing ring 24.

The lower exterior cylindrical surface of collar 16 is provided with screw threads 25 adapted to co-actingly engage the threads of well 22.

In the normal or non-operative position (Fig. 3) a metal disc 26 is seated upon shoulder 23 of well piece 22 and the collar with its encased tube 10 is threaded into the well piece 22 until the bottom of the collar engages the sealing ring 24 in a gas tight relationship (Fig. 3). In this position the gas bomb provided with, for example, 150 pounds per square inch of nitrogen gas and a dry flocculent powder of sodium bicarbonate is ready for emergency use.

When a tire fire is noted, the truck operator seizes the extinguisher and inserts point 11 by means of foot pressure applied to foot shoulder 13 into the burning tire 27 which is permanently damaged and ruined because of the internal smoldering fire therein. After the tube is inserted in the tire the bomb 19 is pushed inwardly or axially relative to the tube 10 whereupon the top point 12 of tube 10 pierces the sealing diaphragm 26 (Fig. 4) bending the pierced area backwards and permitting the high pressure nitrogen gas and the dry powder sodium bicarbonate to enter tube 10 and thence to enter the burning tire 27 whereupon the fire is extinguished.

The downward movement of the bomb container 19 (Fig. 2) is arrested by collar 16 engaging ring 14, said engagement being effected after the diaphragm 26 is fully pierced (Fig. 4). To prevent loss of gas from the bomb 19 and between the collar 16 and tube 10 a second sealing ring 28 of suitable material is provided.

Having read this disclosure, those skilled in the art will readily conceive variants thereof but all these variants fall within the broad disclosure of this invention and are intended to be covered by the claims herein.

I claim:

1. A fire extinguisher for putting out tire fires and having a high pressure resistant container comprising a pressure resistant container having a mouth aperture, a tubular bushing mounted in the mouth aperture of the container having an internal seat and having internally disposed screw threads hermetically secured to the walls of said container aperture, a pierceable disc seated hermetically on said bushing seat, a tubular collar secured in said bushing against said disc, and a pointed tubular element moveably and captively disposed partially within said collar whereby movement of said tube toward said container effects rupture of said disc thereby permitting the high pressure gas to escape through said tubular element.

2. A dry powder fire extinguisher adapted to propel dry powder fire extinguishing chemicals by means of an inert gas comprising a pressure resistant container having a mouth, a tubular bushing having a seat flange and screw threaded interiorally in the tubular area thereof mounted in the mouth of said container, a pierceable metal disc seated on said seat flange, a tubular collar having externally disposed threads secured within said bushing and a tube having points at both the top and bottom ends of said tube, disposed movably and captively at the top end in said collar whereby relative movement of said container toward said pointed tube effects rupture of the disc by said pointed tube thereby permitting the high pressure inert gas to escape through said tube.

3. The apparatus of claim 2 wherein said tube is provided with a pair of spaced-apart fixedly secured rings adapted to slidingly engage said collar and wherein said tube is further provided with a foot pedal adjacent the bottom end.

References Cited in the file of this patent

UNITED STATES PATENTS

| | | |
|---|---|---|
| 2,260,515 | Ensminger et al. | Oct. 28, 1941 |
| 2,506,126 | Williamson et al. | May 2, 1950 |

FOREIGN PATENTS

| | | |
|---|---|---|
| 604,199 | Great Britain | of 1948 |